United States Patent
Shepherd et al.

(10) Patent No.: US 12,430,290 B1
(45) Date of Patent: Sep. 30, 2025

(54) STORAGE MANAGEMENT IN A CLUSTERED STORAGE ENVIRONMENT

(71) Applicant: State Farm Mutual Automobile Insurance Company, Bloomington, IL (US)

(72) Inventors: Nate Shepherd, Bloomington, IL (US); Margaret L. Christopher, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 18/407,250

(22) Filed: Jan. 8, 2024

(51) Int. Cl.
*G06F 16/13* (2019.01)
*G06F 16/14* (2019.01)

(52) U.S. Cl.
CPC .......... *G06F 16/134* (2019.01); *G06F 16/144* (2019.01)

(58) Field of Classification Search
CPC ............................. G06F 16/134; G06F 16/144
See application file for complete search history.

(56) References Cited

U.S. PATENT DOCUMENTS

| | | | |
|---|---|---|---|
| 10,521,396 B2 | 12/2019 | Muthukkaruppan | |
| 10,853,082 B1 * | 12/2020 | Aleti | G06F 9/3867 |
| 2009/0144388 A1 | 6/2009 | Gross | |
| 2010/0114824 A1 | 5/2010 | Krishnaprasad | |
| 2017/0124167 A1 * | 5/2017 | Pasupathy | H04L 67/1097 |
| 2019/0243546 A1 * | 8/2019 | Cherubini | G06F 3/0604 |

OTHER PUBLICATIONS

Amazon.com "AWS Global Accelerator," downloaded from https://aws.amazon.com/global-accelerator/ on Jan. 5, 2024, 9 pages.
Amazon.com, "Cross-Region DNS-based load balancing and failover," downloaded from https://docs.aws.amazon.com/whitepapers/latest/real-time-communication-on-aws/cross-region-dns-based-load-balancing-and-failover.html on Jan. 5, 2024, 35 pages.
Liang et al., "Machine Learning Application s in the Routing in Computer Networks," arXiv preprint arXiv:2104.01946, 2021, 14 pages.

* cited by examiner

*Primary Examiner* — Huawen A Peng
(74) *Attorney, Agent, or Firm* — Lee & Hayes, P.C.

(57) ABSTRACT

This disclosure describes techniques for enabling efficient and/or expeditious retrieval of data records stored across a clustered storage framework. An example system manages storage of data records in the storage clusters based on predefined placement rules. Frequently accessed data records are stored in a local high-performance store storage medium to reduce retrieval latency. The system determines which storage cluster to retrieve a requested data record from by selecting the cluster with the highest weight, as determined based on performance-related metrics like cluster utilization and geographic proximity.

19 Claims, 5 Drawing Sheets

STORAGE MANAGEMENT IN A CLUSTERED STORAGE ENVIRONMENT

TECHNICAL FIELD

The present disclosure relates to computer data storage systems, and more particularly to techniques for data retrieval optimization for clustered storage frameworks.

BACKGROUND

In modern computing environments, large volumes of data records are stored in distributed storage systems including clustered storage nodes. Storing data records across clusters of storage servers provides scalability and redundancy compared to legacy monolithic database architectures.

However, managing and efficiently retrieving data distributed across clustered storage servers introduces challenges related to placement of data on storage clusters and routing of data retrieval requests to selected clusters. Furthermore, retrieving data records from storage clusters introduces latencies related to cluster selection. Accordingly, legacy distributed data storage clustering solutions face challenges related to inefficient data placement and request routing.

Examples of the techniques described in the present disclosure are directed to overcoming the deficiencies noted above.

SUMMARY

In some examples, the techniques described herein relate to a computer-implemented method, including receiving, by a processor and from a first computing device, a first request to retrieve a first data record from a storage framework, the storage framework comprising a first storage cluster, and a second storage cluster. The method further includes querying, by the processor, a storage medium to determine that the first data record is stored on the first storage cluster and the second storage cluster, a first weight associated with the first storage cluster, and a second weight associated with the second storage cluster. The method further includes selecting, by the processor and based on the first weight and the second weight, the first storage cluster as a target cluster for retrieval of the first data record. The method further includes providing, by the processor, the first request to the first storage cluster. The method further includes receiving, by the processor and based on providing the first request to the first storage cluster, the first data record from the first storage cluster. The method further includes providing, by the processor and to the first computing device, the first data record.

In additional examples, the techniques described herein relate to a computing system, including: a processor; and memory storing computer-executable instructions that, when executed by the processor, cause the computing system to perform operations including receiving, from a first computing device, a first request to retrieve a first data record from a storage framework, the storage framework comprising a first storage cluster, and a second storage cluster. The operations further include querying a storage medium to determine that the first data record is stored on the first storage cluster and the second storage cluster, a first weight associated with the first storage cluster, and a second weight associated with the second storage cluster. The operations further include selecting, based on the first weight and the second weight, the first storage cluster as a target cluster for retrieval of the first data record. The operations further include providing the first request to the first storage cluster. The operations further include receiving, based on providing the first request to the first storage cluster, the first data record from the first storage cluster. The operations further include providing, to the first computing device, the first data record.

In further examples, the techniques described herein relate to one or more non-transitory computer-readable media storing computer-executable instructions that, when executed by the processor, cause the one or more processors to perform operations, including receiving, from a first computing device, a first request to retrieve a first data record from a storage framework, the storage framework comprising a first storage cluster, and a second storage cluster. The operations further include querying a storage medium to determine that the first data record is stored on the first storage cluster and the second storage cluster, a first weight associated with the first storage cluster, and a second weight associated with the second storage cluster. The operations further include selecting, based on the first weight and the second weight, the first storage cluster as a target cluster for retrieval of the first data record. The operations further include providing the first request to the first storage cluster. The operations further include receiving, based on providing the first request to the first storage cluster, the first data record from the first storage cluster. The operations further include providing, to the first computing device, the first data record.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes techniques for enabling efficient and/or expeditious retrieval of data records stored across a clustered storage framework. An example system manages storage of data records in the storage clusters based on predefined placement rules. Frequently accessed data records are stored in a local high-performance store storage medium to reduce retrieval latency. The system determines which storage cluster to retrieve a requested data record from by selecting the cluster with the highest weight, as determined based on performance-related metrics like cluster utilization and geographic proximity.

Figure 1:
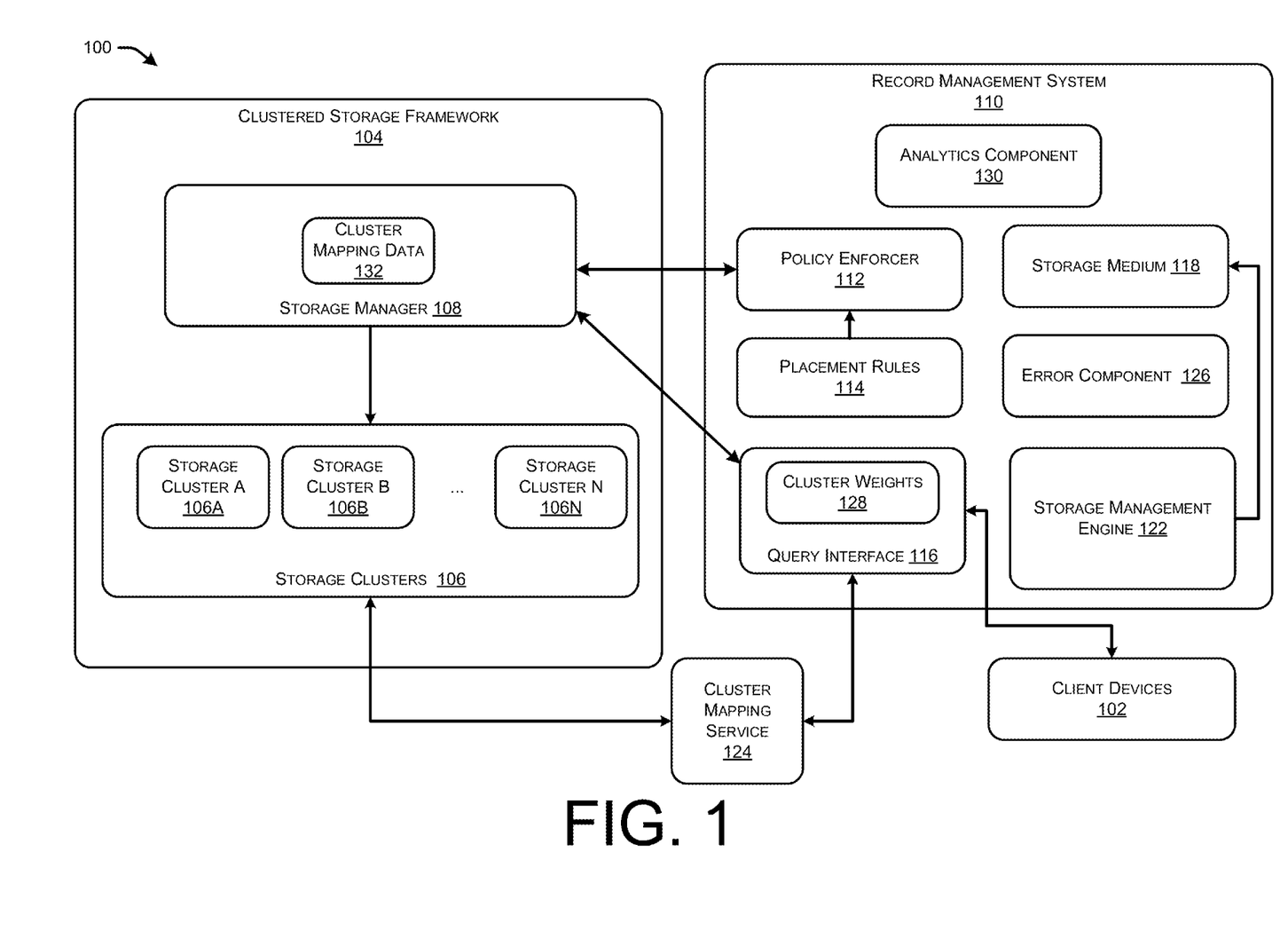
FIG. 1 depicts an example environment that enables a set of client devices to access data stored in a clustered storage framework via a record management system.

FIG. 1 depicts an example environment 100 that enables a set of client devices 102 to access data stored in a clustered storage framework 104 via a record management system 110. The record management system 110 facilitates efficient data retrieval operations by leveraging a multi-tier storage architecture consisting of a set of N storage clusters 106 (e.g., storage cluster A 106A, storage cluster B 106B, and storage cluster N 106N) and a storage medium 118.

Client devices 102 include computing devices used by end users to submit data retrieval queries and access requested data records. Examples of client devices 102 include desktop computers, laptops, tablets, smartphones, or any other device capable of submitting data requests and processing returned data. The client devices 102 may be communicatively coupled to the record management system 110 via one or more networks. Any of the client devices may include one or more processors, microprocessors, computing engines, or other like components, and one or more such components may be configured to perform one or more of the operations described herein.

The clustered storage framework 104 may include multiple storage clusters 106 managed by a storage manager 108. The storage clusters 106 may be distributed computing nodes that are configured to store data records (e.g., insurance policy records). The clustered storage framework 104 may utilize the storage clusters 106 to store data in a replicated and redundant fashion to ensure high availability and reliability. In some cases, the storage clusters 106 may be implemented as Non-Structured Query Language (NoSQL) database clusters and/or Hadoop clusters.

The storage manager 108 may coordinate storage of data on the underlying storage clusters 106. For example, the storage manager 108 may be configured to perform operations for monitoring disk usage across the storage clusters 106, adding and/or removing clusters to adjust storage capacity, directing data storage across the storage clusters 106, and/or managing data replication and redundancy policies across the storage clusters 106.

In some cases, the storage manager 108 may be configured to add data records to a storage cluster or remove data records to a storage cluster. For example, storage manager 108 may be configured to add and/or data records from the storage clusters 106 based on instructions received from the record management system 110. Accordingly, the storage manager 108 may provide an interface for the record management system 110 to access and/or modify data records stored across the storage clusters 106.

The storage manager 108 may store cluster mapping data 132 that map each data record stored on the storage clusters 106 to a specific set of storage clusters 106 that contain the data record. In some cases, when the storage manager 108 writes a new data record to a set of storage clusters 106 according to the instructions provided by the policy enforcer 112, the storage manager 108 may update the cluster mapping data 132 to add mappings that associate the new data record with the target clusters. In some cases, when data is relocated within storage clusters 106 (e.g., for storage load balancing and/or migration to new hardware), the storage manager 108 updates the cluster mapping data 132 to reflect the new data locations.

The record management system 110 may be configured to improve performance (e.g., efficiency, success ratio, and/or speed) of data storage operations and/or data retrieval operations performed in relation to data stored on the clustered storage framework 104. For example, the record management system 110 may enable the client devices 102 to retrieve data stored on the clustered storage framework 104 without reduced retrieval time. To enable such improved data retrieval, the record management system 110 may use caching, cluster mapping, query routing, and/or data management techniques.

In some cases, the record management system 110 may store a subset of data stored by the clustered storage framework 104 on the storage medium 118. As another example, the record management system 110 may store data mapping data records to specific storage clusters and use such mapping data in determinations about which clusters to communicate with while performing operations corresponding to a specific data retrieval request associated with a specific data record. As an additional example, the record management system 110 may use routing algorithms to load balance data retrieval requests across the storage clusters 106. As a further example, the record management system 110 may use data retrieval patterns (e.g., data retrieval latency patterns) to guide continuous optimization of data storage on the storage clusters 106, storage of data records and/or data record mappings on the storage medium 118, and/or routing of data retrieval requests to specific storage clusters.

The record management system 110 includes a policy enforcer 112, a set of placement rules 114, a query interface 116, a storage management engine 122, a set of retrieval statistics, and a storage medium 118. The policy enforcer 112 may direct the storage of data records on the storage clusters 106 according to placement rules 114. When client devices 102 and/or other data sources submit new data records to be stored on the clustered storage framework 104, the policy enforcer 112 may determine, based on features (e.g., data type, content data, data structure, data format, and/or the like) associated with the new data records and by applying the placement rules 114, desirable storage locations for each data record within the storage clusters 106. Placement rules 114 may represent data predefined placement policies, such as predefined placement policies defined based on dynamic performance metrics associated with the clustered storage framework 104. In some cases, after determining a set of desired storage clusters for a new data record, the policy enforcer 112 may provide an instruction to the storage manager 108 to store the new data record on the set of desired storage clusters. The storage manager 108 may then perform data storage operations in response to the instructions provided by the policy enforcer 112.

For example, consider two new data records, Record A and Record B, that are submitted to the record management system 110 for storage. Record A may contain personnel data, such as employee names, addresses, salaries, and/or the like. Record B may contain sales transaction data for the company's ecommerce platform, such as customer IDs, order details, payment info, and/or the like. Based on the placement rules 114, personnel data records like Record A may be directed to a storage cluster with high security and reliability specifications, for example to protect the confidentiality of employee data. Meanwhile, transaction data like Record B may be directed to a storage cluster optimized for high input/output throughput, for example to support fast querying of transactional data. In this example, Record A may be routed by the policy enforcer 112 to Storage Cluster 1, which provides encrypted storage volumes with triple replication. Additionally, Record B may be routed to Storage Cluster 2, which provides redundant array of independent disks (RAID) storage volumes optimized for parallel input/output (I/O) performance.

The placement rules 114 may represent a predefined set of policies that guide how data records are stored on storage clusters 106. In some cases, the placement rules 114 collectively provide a policy framework to guide optimal data placement decisions in relation to storage clusters 106. The placement rules 114 may be defined by a database administrator to improve data retrieval, data management, and data storage efficiency across the clustered storage framework 104.

For example, the placement rules 114 may require storing data records based on geographic considerations, data relationships, security requirements, performance needs, redundancy requirements, and/or replication policies. Examples of the placement rules 114 include rules requiring storing geographically related records in the same region-specific cluster to reduce retrieval latency, storing frequently-accessed data records on clusters using high-performance storage media (e.g., solid state drives (SSDs)), storing a subset of data records on the storage clusters 106 in a round-robin fashion to enhance evenness of data distribution across the storage clusters 106, storing critical data records across multiple storage clusters 106 to enhance data redundancy and/or availability, storing a subset of data records that are associated with a common access pattern and/or that are related on a common set of storage clusters, storing a subset of data records (e.g., regulated data records, sensitive data records, and/or the like) into designated secure storage clusters to enable enhanced access controls, storing rarely-accessed data records on low-performance (e.g., low-cost) storage media, and/or allocating storage capacity on storage clusters based on predicted data size and/or data lifespan (e.g., based on predicted data size growth across time).

The query interface 116 provides an interface through which client devices 102 can provide data retrieval requests to the record management system 110. Each data retrieval request may be a request to retrieve a specific data record from the clustered storage framework 104. In some cases, after receiving a data retrieval request, the query interface 116 parses the request, determines the target data being requested, and initiates data retrieval operations by using either the storage medium 118 or the storage clusters 106.

The query interface 116 may be configured to receive data access queries from client devices 102, retrieve the queried data from one of the storage medium 118 or the storage clusters 106, and provide the data to the client devices 102 and/or to the storage management engine 122. To retrieve a data record, the query interface 116 may perform the following operations: (i) determine whether the data record is accessible via the storage medium 118, (ii) if the data record is accessible via the storage medium 118, retrieve the data record from the storage medium 118, and (iii) if the data record is not accessible via the storage medium 118, identify a target storage cluster 106 to retrieve the data record from and retrieve the data record from that target cluster.

To determine which storage cluster 106 to retrieve a data record from, the query interface 116 may: (i) determine a subset of storage clusters that store the data record, (ii) determine a cluster weight for each storage cluster in the subset, and (iii) retrieve the data record from the cluster having the highest weight. Cluster weights 128 may be determined based on network utilization rates associated with clusters, hit ratios associated with clusters, cluster availability indicators, geographic proximity measures associated with cluster locations, and/or the like. For example, a cluster with a higher hit ratio may have a higher cluster weight. In some cases, cluster weights 128 may be randomly modified to route different data retrieval queries to different clusters. The weights may represent likelihoods of retrieval and may be assessed using a likelihood threshold.

Cluster weights can be determined based on various factors such as network utilization, hit ratio, availability, and/or geographic proximity. For example, Cluster A may have 50% network utilization, Cluster B 80%, and Cluster C 30%, so the weights could be 0.7, 0.3, and 0.9 respectively to account for the network utilization. Similarly, cluster weights can be set based on hit ratio, like 0.6 for Cluster A's 60% hit ratio, 0.8 for Cluster B's 80% hit ratio, and 0.4 for Cluster C's 40% hit ratio. Similarly, cluster weights can be set based on cluster uptime, with Cluster A having a weight of 0.9 for 95% uptime, Cluster B having a weight of 1.0 for 99% uptime, and Cluster C having a weight of 0.8 for 85% uptime. Finally, if the user is in New York, weights could be influenced by geographic proximity, with Cluster A in New Jersey having a weight of 0.8, Cluster B in California having a weight of 0.5, and Cluster C in New York having a weight of 1.0.

In some cases, cluster weight for a data record may be determined based on a number of retrievals of the data record within a time period and/or a retrieval frequency for the data record within the time period. In some cases, if the query interface 116 receives notification about unavailability of a storage cluster, the query interface 116 updates the storage cluster's weight to a predefined value, such as to a value of zero.

In some cases, given a set of storage clusters that each includes a target data record is associated with a cluster weight, the query interface 116 selects which cluster(s) to retrieve the target data record by sampling (e.g., randomly sampling) a value from a distribution and then determining whether the value exceeds a distribution determined based on the cluster weights. For example, if the requested data record is stored on a cluster A with a weight of 0.6 and a cluster B weight a weight of 0.4, the query interface may sample a value from the range [0, 1], retrieve the data record from cluster A if the sampled value is between [0, 0.6], and retrieve the data record from cluster B if the sampled value is between (0.6, 1].

As another example, consider a data record that is replicated across three storage clusters: cluster X with a weight of 0.5, cluster Y with a weight of 0.3, and cluster Z with a weight of 0.2. When the query interface 116 receives a request for this data record, the query interface 116 may sample a value between 0 and 1. If the sampled value is between 0 and 0.5, the data record would be retrieved from cluster X. If the sampled value is between 0.5 and 0.8, the data record retrieval would be handled by cluster Y. If the sampled value falls between 0.8 and 1, cluster Z would be queried for the data record. This may enable the read traffic to be randomly split across the three clusters in a 50/30/20 ratio on average, without explicitly tracking the utilization or load on each storage cluster.

In some cases, the query interface 116 may retrieve a data record from a storage cluster using a cluster mapping service 124. The cluster mapping service 124 may be configured to select an instance of the clustered storage framework 104 to query from and/or provide a uniform resource locator (URL) for that instance. In some cases, the cluster mapping service 124 operates as an abstraction layer on top of the physical storage clusters, allowing the details of cluster selection and load balancing to be encapsulated. In some cases, when the query interface 116 seeks to retrieve a data record, the query interface 116 passes the record identifier to the cluster mapping service 124 to obtain a URL for a cluster framework instance. The query interface 116 may then use the provided URL to query the selected storage cluster instance. This allows the complexity of selecting an appropriate cluster instance to be hidden behind the cluster mapping service abstraction layer. In some cases, the cluster mapping service 124 may select instances based on factors such as current system load, network proximity, data locality, or other optimizations. By selecting instances programmatically via the mapping service 124, the querying interface 116 may not need to have intrinsic knowledge of the underlying cluster topology.

In some cases, to improve data retrieval speed, query interface 116 uses storage capacities provided by the storage medium 118. The storage medium 118 may be local to the record management system 110, as opposed to being stored on the clustered storage framework 104. Accordingly, data retrieval from the storage medium 118 may be faster than data retrieval from the clustered storage framework 104, because the former does not require using a networked connection while the latter requires using a networked connection between the record management system 110 and the clustered storage framework 104. In some cases, the storage medium 118 includes high-performance storage media (e.g., SSDs). In some cases, the storage medium 118 includes storage media with fast retrieval times and/or higher bandwidth.

In some cases, the storage medium 118 stores a set of data records and a set of cluster mappings. For example, the data records may include a set of most frequently retrieved data records, while the cluster mappings may include mappings of a set of second-most frequently retrieved data records to their respective storage clusters.

The storage management engine 122 may apply different storage criteria when determining which data records to store directly and which data records to store indirectly by storing their respective cluster mappings. For example, the top 10% most frequently accessed records may be stored on the storage medium 118, while the mappings for the next 20% of frequent records may be added to the cluster mappings stored on the storage medium 118.

The storage management engine 122 may also be configured to remove data records and/or cluster mappings associated with data records from the storage medium 118. In some cases, the storage management engine 122 receives a notification indicative of an update to a data record. Based on receiving the notification, the storage management engine 122 may remove the data record from the storage medium 118. In some cases, based on determining that the retrieval statistics for a data record fail to satisfy a threshold condition, the storage management engine 122 removes the data record from the storage medium 118. The threshold condition may be determined based on retrieval statistics associated with other data records, for example based on a distribution of all retrieval statistics. For example, in some cases, based on determining that a second retrieval statistic has a value that exceeds the threshold condition, the threshold condition is updated.

In some cases, after mapping a data retrieval request to a requested data record, the query interface 116 determines whether the requested data record is available in the storage medium 118. If the requested data record is available in the storage medium 118, the query interface 116 retrieves the data record from the storage medium 118 and avoids a data retrieval from the storage clusters 106 of the clustered storage framework 104. If the requested data record is not available in storage medium 118, the query interface 116 determines which storage cluster(s) to retrieve the data record from and communicates with those storage cluster(s). In some cases, after retrieving a data record from the target storage cluster(s), the query interface 116 provides the requested data record to the requesting client device and/or to the storage management engine 122.

To determine which specific storage cluster 106 to retrieve a data record from, the query interface 116 may first determine which storage clusters store the data record and may select one or more of those storage clusters. To determine the storage clusters that store a particular data record, the query interface 116 may use at least one of the cluster mapping data 132 stored by the storage manager 108 or the cluster mappings stored on the storage medium 118.

For example, the query interface 116 may first query the cluster mappings in the storage medium 118 to determine if the cluster identifier(s) for the requested record is stored on the storage medium 118. If the cluster identifier(s) for the requested record is stored on the storage medium 118, the query interface 116 may use such cluster identifiers. Otherwise, if the cluster identifier(s) for the requested record is not stored on the storage medium 118, the query interface 116 may query the storage manager 108 to determine the corresponding cluster identifiers for storage clusters that store the requested record.

If a requested data record is available on more than one storage cluster, the query interface 116 may analyze cluster load metrics, cluster availability indicators, network traffic patterns, and/or geographic proximity metrics to select a desired of those multiple clusters. The desired number may be selected based on a priority score and/or a retrieval latency requirement associated with the requested record.

For example, the query interface 116 may route data retrieval requests to available clusters with lower utilization (e.g., in real-time) to balance loads across the storage clusters 106. Routing requests to lower-utilization clusters may improve availability and reliability of a clustered storage framework. As another example, the query interface 116 may route at least a subset of data retrieval requests (e.g., data retrieval requests associated with critical data records) to storage clusters associated with faster and/or less congested network paths. Routing requests to faster and/or less-congested clusters may improve availability and reliability of a clustered storage framework and/or reduce data retrieval time from a clustered storage framework. As an additional example, the query interface 116 may route at least a subset of the data retrieval requests to available storage clusters that are topologically and/or physically closer on the network to the record management system 110 to reduce data retrieval latency.

The storage management engine 122 may determine whether to store (e.g., cache) a data record retrieved from the storage cluster(s) 106 on the storage medium 118. This determination may be based on performance and/or retrieval metrics associated with the data record.

For example, the storage management engine 122 may determine that a subset of most frequently retrieved data records (e.g., a subset of data records whose data retrieval count and/or data retrieval frequency) exceeds a threshold should be stored on the storage medium 118. As another example, the storage management engine 122 may determine that a subset of data records whose data retrieval latency exceeds a threshold should be stored on the storage medium 118. As a further example, the storage management engine 122 may determine that a subset of data records that are designated as being critical and/or sensitive may be stored on the storage medium 118.

In some cases, to determine whether to store a retrieved data record on the storage medium 118, the storage management engine 122 may use a retrieval statistic associated with the retrieved data record. A set of retrieval statistics may be maintained for data records stored on the storage cluster(s) 106. The retrieval statistics may include, for each data record, a data retrieval count, a data retrieval frequency, a data retrieval latency, and/or other statistics related to accessing the data record on the storage cluster(s) 106. The storage management engine 122 may compare the retrieval statistics associated with the data records stored on the storage clusters 106 to one or more storage criteria to determine whether a data record qualifies for storage on the storage medium 118.

For example, the storage criteria may specify threshold(s) for data retrieval count, data retrieval frequency, data retrieval latency, and/or the like. If the retrieval statistics of a data record satisfy the storage criteria, the storage management engine 122 may store the data record in the storage medium 118. In some cases, the storage criteria include both criteria for determining which data records to store on the storage medium 118 and which cluster mappings to store on the storage medium 118.

In some cases, the storage management engine 122 may determine a priority score for a data record based on the retrieval statistics associated with the data record. Data records that are more frequently or recently retrieved, have higher access latencies, and/or are designated as sensitive and/or critical may be given higher priority scores. Data records with higher priority scores may be stored in the storage medium 118. In some cases, the storage management engine 122 may determine a priority score for a data record based on the retrieval statistics associated with the data record. Data records that are more frequently or recently retrieved, have higher access latencies, and/or are designated as sensitive and/or critical may be given higher priority scores. For example, a data record that was retrieved 10 times in the past hour may be given a priority score of 90, while a data record that was retrieved once in the past day may be given a priority score of 50. As another example, a data record with an average access latency of 500 ms may be given a priority score of 80, while a data record with an average access latency of 100 ms may be given a priority score of 60.

In some cases, if data needs to be removed from the storage medium 118 to make space for a new data record, lower priority score data records may be removed before higher priority score data records. The storage management engine 122 may monitor ongoing usage of the stored data records in the storage medium 118. Based on such monitoring, the storage management engine 122 may adjust the priority score of stored data records. For example, data records that are subject to increased retrievals after being stored may have their priority scores increased, while data records that are subject to decreased retrievals after being stored may have their priority scores decreased. As another example, records that have remained stored on the storage medium 18 for a period of time that exceeds a threshold without any retrievals may have their priority scores decreased. Based on changes to data record priority scores, the storage management engine 122 may choose to remove some data records stored on the storage medium 18 to provide storage capacity for other data.

The storage management engine 122 may apply additional criteria or policies to determine whether to store a data record in the storage medium 118. For example, the storage criteria may specify types of data records that should or should not be stored on the storage medium 118, key ranges or subsets of data to store or not store, minimum and/or maximum data record size limits for data records stored on the storage medium 118, and/or the like. Caching of certain data record types, keys, or key ranges may be disabled for security, compliance, and/or storage efficiency reasons.

In some embodiments, the storage management engine 122 decides not only whether to store (e.g., cache) a data record, but also determines the storage duration associated with the data record. For example, a time-to-live (TTL) value may be assigned to each data record, representing the duration of time the data record may be stored. After the TTL expires, the data record may be removed from the storage medium 118. TTL values may be determined based on storage priority scores, data record utility, and/or available capacity of the storage medium 118.

In some cases, in addition to the storage of frequently accessed data records themselves, the storage medium 118 may also be used to store mappings of data records to their locations within storage clusters 106. In some cases, cluster mappings associated with all or a subset of the data records stored on the storage clusters 106 may be stored on the storage medium 118. By storage cluster mappings in the high-performance storage medium 118, the query interface 116 can more rapidly determine which clusters contain a requested data record without having to query slower back-end mapping data. This may enable faster routing of retrieval requests to target storage clusters. In some cases, when adding a new data record, the policy enforcer 112 may update the cluster mappings in the storage medium 118.

In some cases, the storage medium 118 may store both the most frequently retrieved data records as well as cluster mappings for the second-most frequently retrieved records. For example, the top 10% most frequently accessed data records may be stored directly in the storage medium 118 to allow fast retrieval. Meanwhile, the cluster mappings for the next 20% of frequently retrieved records may be stored to accelerate routing of requests to the target storage clusters.

Therefore, in some cases, the most performance-critical data may be stored directly on the storage medium 118, while the second-tier data may be stored indirectly and by reference to enhance request routing. This dual-tier storage approach combines the maximal latency reduction of the storage of top-tier data with the routing performance benefits of storing mappings for second-tier data. The precise distribution of storage of the data records and mappings may be determined based on data access patterns, relative costs of storage records and mappings, relative costs of retrieving records and mappings, and/or total storage capacity associated with the storage medium 118.

For example, the storage management engine 122 may store the top 10% most frequently accessed data records directly in the storage medium 118, while the storage of condensed metadata mappings for the remaining 90% of less frequently accessed data records. As another example, the storage management engine 122 may analyze data access patterns to determine that 5% of data records account for 50% of read requests. Since these hot records are frequently accessed, the storage management engine 122 may opt to store them directly despite their large size, since the high access frequency justifies the storage space. For the remaining 95% of records which are accessed infrequently, the storage management engine 122 may choose to store condensed metadata mappings rather than the actual records. As an additional example, the storage management engine 122 may determine that the storage of a mapping may have a relative cost of 5 units while the storage of the actual record may cost 100 units, and data retrieval has a similar 10 times cost difference. Given a total storage capacity of 10000 units, storing the hot 5% of records directly (500 units) and mapping the remaining 95% (9500 units) may be determined to be the optimal distribution for overall performance based on the data access patterns, relative costs, and total storage capacity.

In some cases, the record management system 110 includes an error monitoring component 126. The error monitoring component 126 may be configured to monitor the overall health of the clustered storage framework by tracking metrics such as request latencies, failure rates, and system load. When queries are provided to the storage cluster via the query interface 116, the error monitoring component 126 may start a timer to track the overall time for the query to complete. If the query takes longer than expected, the monitoring component can register this as a potential performance degradation issue.

In some cases, the record management system 110 includes analytics reporting component 130 that is configured to generate insights and statistics about usage patterns and performance of the clustered storage framework 104. The analytics reporting component 130 may aggregate log data and metrics that are tracked by other controller components like the error monitoring component 126. This log data can then be processed through statistical analysis, data mining, predictive modeling, and/or machine learning algorithms to surface meaningful insights. For example, aggregated performance logs may be analyzed to detect peak usage patterns to enable cluster capacity to be right-sized or utilization to be optimized. Predictive algorithms may also be trained on past failure data to develop models that forecast the likelihood of future failures, for example to enable preemptive maintenance.

Accordingly, in some cases, the environment 100 enables: (i) storage of data records on the storage clusters 106 based on a set of placement rules 114, (ii) retrieval of data records from specific storage clusters based on the cluster weights 128, (iii) storage of data records on the storage medium 118 based on the retrieval statistics, and (iv) storage of cluster mappings for data records on the storage medium 118. For example, to store data records on storage clusters 106, the policy enforcer 112 may apply a predefined set of policies defined by the set of placement rules 114 that guide how data records are stored on the storage clusters 106. As another example, to determine which storage cluster 106 to retrieve a data record from, the query interface 116 may: (i) determine a subset of storage clusters that store the data record, (ii) determine a cluster weight for each storage cluster in the subset, and (iii) retrieve the data record from the cluster having the highest weight. As an additional example, to manage storage of data records on the storage medium 118 based on the retrieval statistics, the storage management engine 122 may compare the retrieval statistics associated with a data record to one or more storage criteria to determine whether the data record qualifies for storage on the storage medium 118. As a further example, to manage storage of cluster mappings for data records on the storage medium 118, the storage medium 118 may store both the most frequently retrieved data records as well as cluster mappings for the second-most frequently retrieved records.

In some cases, the environment 100 enables various technical advantages. For example, by storing data records across storage clusters 106 according to the placement rules 114, the record management system 110 may enable efficient data storage and/or retrieval. The placement rules 114 may enable optimizing physical data layout associated with the storage clusters 106 to match common access patterns and meet various performance, security, redundancy and/or compliance objectives.

As another example, by retrieving data records from the storage cluster with the highest weight, the record management system 110 enables load balancing across the storage clusters 106. By routing data retrieval requests to storage cluster with lower utilization and/or fewer network bottlenecks, the record management system 110 may reduce data retrieval latency. In some cases, by randomly modifying the cluster weights 128, the record management system 110 further enhances load distribution across the storage clusters 106.

As an additional example, storing frequently accessed data records in a local and/or high-performance storage medium, the record management system 110 reduces data retrieval times. Storing frequently retrieved data records in low latency memory (e.g., cache memory) avoids the need to constantly retrieve the same popular records from remote storage media. In some cases, by managing storage contents based on performance metrics such as the retrieval statistics, the record management system 110 enhances efficient utilization of the limited storage capacity associated with the storage medium 118.

Figure 2:
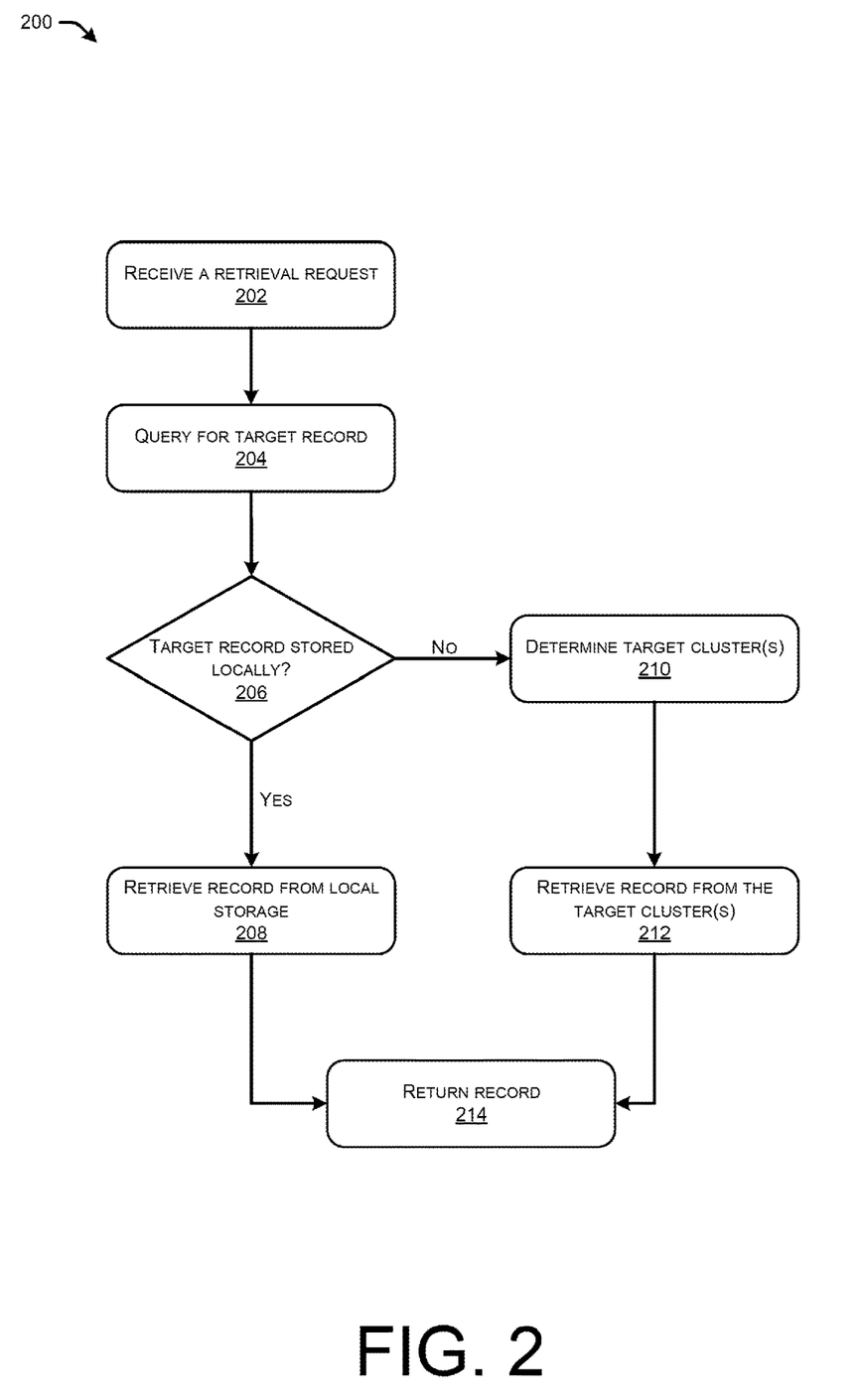
FIG. 2 is a flowchart diagram of an example process for retrieving a requested data record from a clustered storage framework and using the record management system.

FIG. 2 is a flowchart diagram of an example process 200 for retrieving a requested data record from the clustered storage framework 104 and using the record management system 110. As depicted in FIG. 2, at operation 202, the query interface 116 receives a data retrieval request from a client device 102 via the query interface 116. The data retrieval request may specify a target data record to be retrieved, for example using a data record identifier, a data record key, and/or other metadata associated with the requested record. In some cases, after receiving the data retrieval request, the query interface 116 parses the incoming request to identify the requested data record.

At operation 204, the query interface 116 queries the storage medium 118 based on the identified target data record. At operation 206, based on the query results, the query interface determines whether the data record is stored on the storage medium 118. If the requested data record is stored on the storage medium 118 (operation 206—Yes), the query interface 116 proceeds to operation 208 to retrieve the requested record from the storage medium 118 and then proceeds to operation 214 to return the retrieved data record to the requesting client device. If the requested data record is not stored on the storage medium 118 (operation 206—No), the query interface 116 proceeds to operation 210.

At operation 210, the query interface 116 determines a set of target storage clusters to route the data retrieval request to. In some cases, determining the target storage clusters includes: (i) determining a set of candidate storage clusters that store the target data record, and (ii) if the set of candidate storage clusters include more than a desirable number of clusters, selecting a desirable number of clusters based on the cluster weights 128 associated with those candidate storage clusters. The desirable number may be determined based on a score indicating how critical the target data record is and/or a desired retrieval latency for returning the target data record to the requesting client device.

For example, if the requested data record is designated as highly critical, the query interface 116 may select the top 3 highest weighted clusters as the target clusters to provide redundancy. As another example, if the requested data record is not critical, the query interface 116 may select only the single highest weighted cluster as the target to reduce utilization. In some cases, if the candidate storage clusters have similar cluster weights, the query interface 116 may select a random subset of the candidate clusters. Randomizing selection from similarly weighted clusters may enhance load balancing across the storage clusters 106.

At operation 212, the query interface 116 retrieves the target data record by routing the data retrieval request to the set of target storage clusters. After retrieving the target data record from the set of target storage clusters, the query interface 116 proceeds to operation 214 to return the retrieved data record to the requesting client device.

Accordingly, process 200 may enable the record management system 110 to reduce data retrieval latency by using the data records stored on the storage medium 118. This technique may enable the record management system 110 to store the most frequently retrieved data records on the storage medium 118 and reduce the need for querying the clustered storage framework 104 over a networked connection to retrieve such data records.

Figure 3:
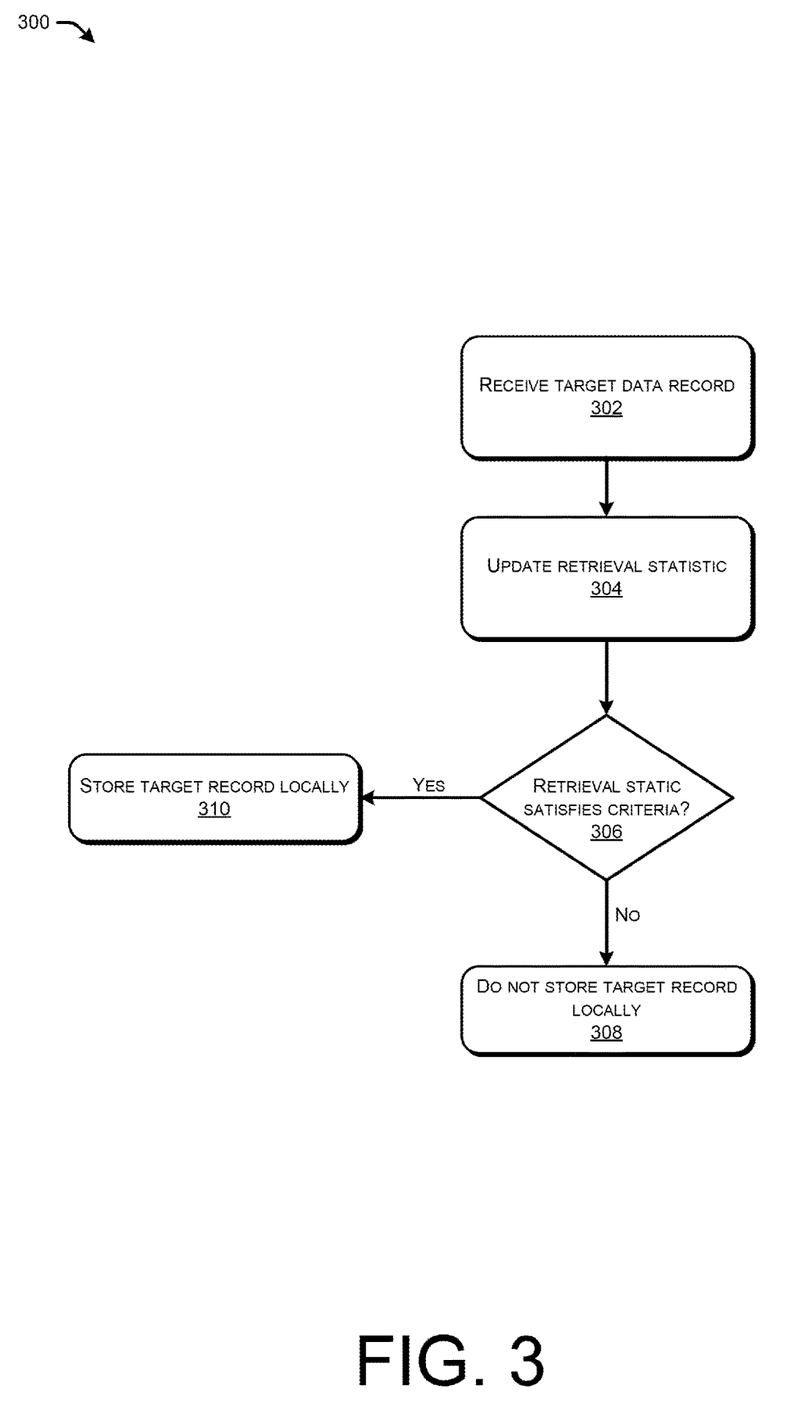
FIG. 3 is a flowchart diagram of an example process for determining whether to store a retrieved data record on a storage medium.

FIG. 3 is a flowchart diagram of an example process 300 for determining whether to store a retrieved data record on the storage medium 118. At operation 302, the storage management engine 122 receives the retrieved data record from the query interface 116. After receiving the retrieved data record, the storage management engine 122 proceeds to operation 304 to determine the retrieval statistics associated with the data record. The retrieval statistics may include metrics such as a data retrieval count, a data retrieval frequency, and/or a data retrieval latency associated with the data record.

At operation 306, the storage management engine 122 compares the retrieval statistics to one or more storage criteria to determine if the data record qualifies for storage in the storage medium 118. For example, the storage criteria may specify thresholds for data retrieval count, data retrieval frequency, and/or data retrieval latency. If a data record exceeds the specified thresholds, the data record may be selected for storage on the storage medium 118. As another example, the storage criteria may specify that certain types or categories of data records should be stored on the storage medium 118.

If the data record meets the storage criteria (operation 306—Yes), the storage management engine 122 proceeds to operation 308 to store the data record in the storage medium 118. The data record may be stored for a TTL duration, such as a TTL score determined based on a respective priority score associated with the data record. In some cases, data records with higher usage and lower latency may receive higher priority scores. If the data record does not meet the storage criteria (operation 306—No), the storage management engine 122 proceeds to operation 310 to not store the data record on the storage medium 118.

Accordingly, process 300 enables using the storage medium 118 to enhance data retrieval speed by generating data record caching determinations based on retrieval statistics associated with the data records stored on the storage clusters 106 and storage criteria. In some cases, the storage management engine 122 can optimize utilization of the limited storage capacity associated with the storage medium 118 by ensuring that only the most beneficial data records are directly stored on the storage medium 118.

Figure 4:
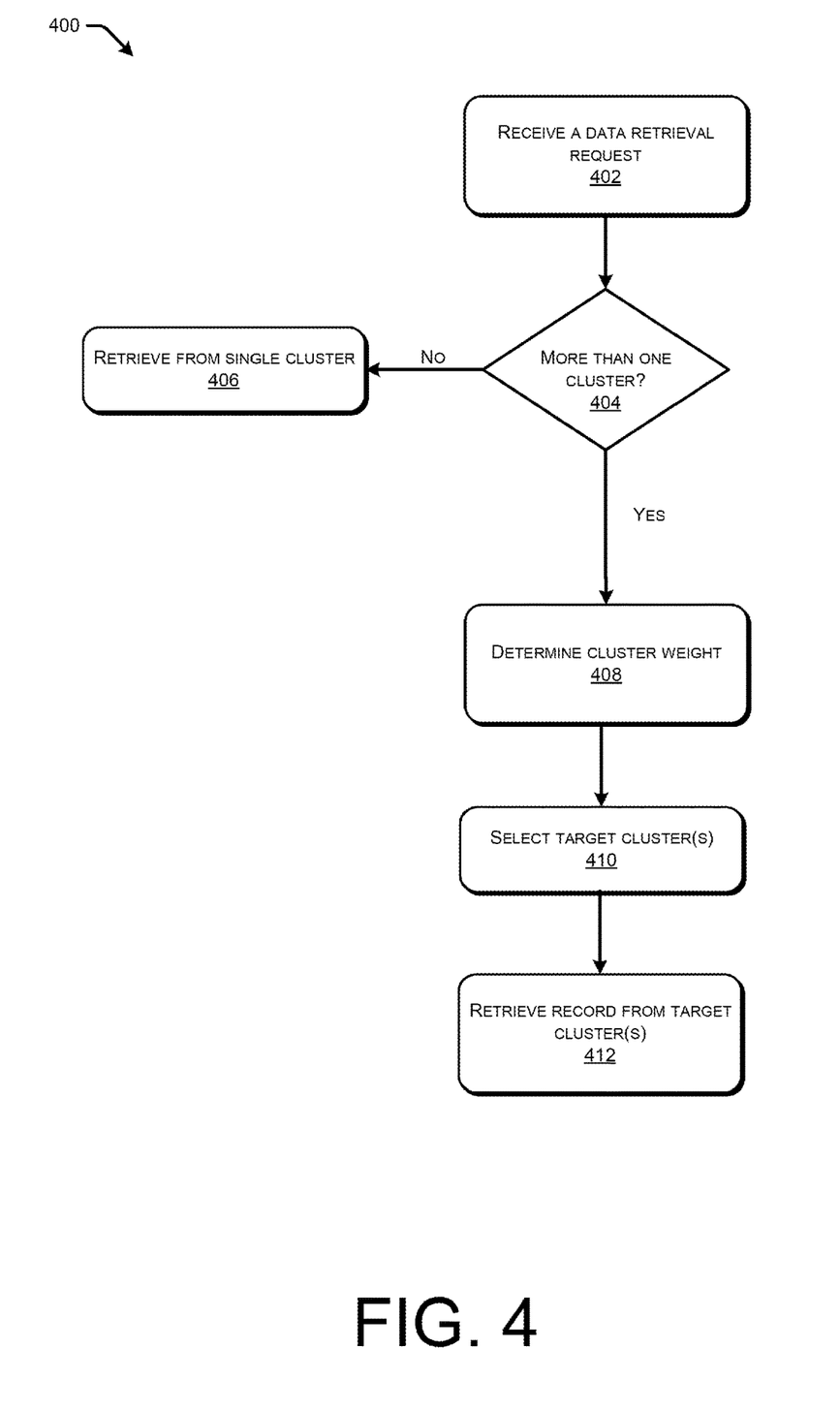
FIG. 4 is a flowchart diagram of an example process for selecting a target storage cluster to retrieve a requested data record.

FIG. 4 is a flowchart diagram of an example process 400 for selecting a target storage cluster to retrieve a requested data record. At operation 402, the query interface 116 receives a data retrieval request specifying a requested data record. After receiving the request, the query interface 116 proceeds to operation 404.

At operation 404, the query interface 116 determines whether more than one storage cluster includes the requested data record.

If only one storage cluster includes the requested data record (operation 404—No), the query interface 116 proceeds to operation 406 to retrieve the requested data record from the one cluster. If more than one storage cluster includes the requested data record (operation 404—No), the query interface 116 proceeds to operation 408 to determine the cluster weight 128 associated with each candidate storage cluster. The cluster weight 128 may represent the relative routing priority of sending data retrieval requests to that cluster. In some cases, storage clusters with higher hit ratios, lower utilization metrics, and/or better geographic proximity metrics may be assigned higher cluster weights.

At operation 410, the query interface 116 selects the storage cluster(s) with the highest cluster weight(s) as the target cluster(s) for retrieving the requested data record. In some cases, by routing retrieval requests to higher weighted clusters, the query interface 116 balances load across clusters and reduces retrieval latency. Process 400 then proceeds to operation 412 to retrieve the requested data record from the selected target cluster(s).

Accordingly, process 400 enables the record management system 110 to use cluster mappings and weighted cluster selections to efficiently route data retrieval requests to storage clusters. In some cases, caching cluster mappings accelerates the cluster selection process while weighted cluster selection enhances load balancing across clusters.

Figure 5:
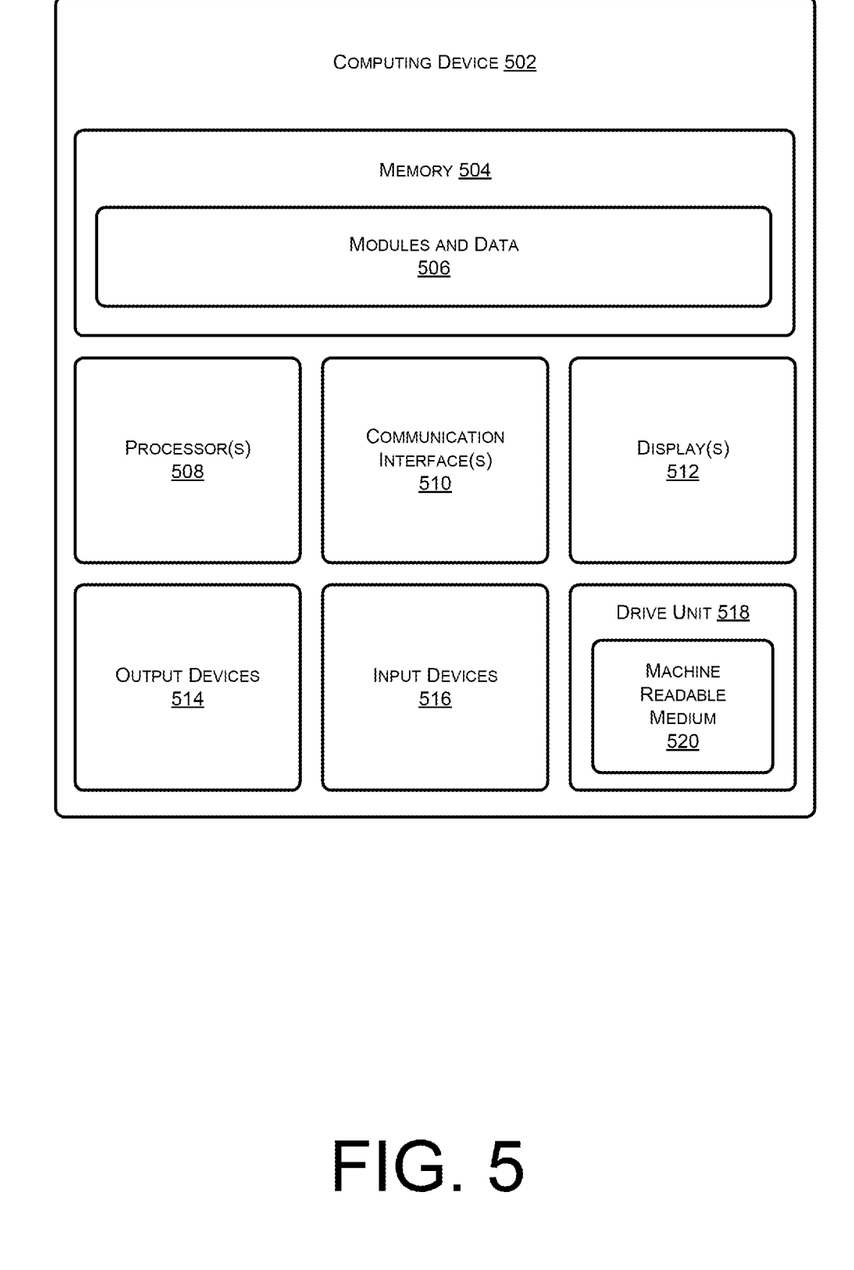
FIG. 5 shows an example system architecture for a computing device associated with an environment described herein.

FIG. 5 shows an example system architecture for a computing device 502 associated with the environment 100 described herein. A computing device 502 can be a server, computer, or other type of computing device that executes at least a portion of the environment 100. In some examples, elements of the environment 100 can be distributed among, and/or be executed by, multiple computing devices 502.

A computing device 502 can include memory 504. In various examples, the memory 504 can include system memory, which may be volatile (such as RAM), non-volatile (such as ROM, flash memory, etc.) or some combination of the two. The memory 504 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media.

Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by one or more computing devices 502 associated with the environment 100. Any such non-transitory computer-readable media may be part of the computing devices 502. The memory 504 can include modules and data 506 needed to perform operations of one or more computing devices 502 of the environment 100.

One or more computing devices 502 of the environment 100 can also have processor(s) 508, communication interfaces 510, displays 512, output devices 514, input devices 516, and/or a drive unit 518 including a machine readable medium 520.

In various examples, the processor(s) 508 can be a central processing unit (CPU), a graphics processing unit (GPU), both a CPU and a GPU, or any other type of processing unit. Each of the one or more processor(s) 508 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 508 may also be responsible for executing computer applications stored in the memory 504, which can be associated with common types of volatile (RAM) and/or nonvolatile (ROM) memory.

The communication interfaces 510 can include transceivers, modems, interfaces, antennas, telephone connections, and/or other components that can transmit and/or receive data over networks, telephone lines, or other connections.

The display 512 can be a liquid crystal display or any other type of display commonly used in computing devices. For example, a display 512 may be a touch-sensitive display screen, and can then also act as an input device or keypad, such as for providing a soft-key keyboard, navigation buttons, or any other type of input.

The output devices 514 can include any sort of output devices known in the art, such as a display 512, speakers, a vibrating mechanism, and/or a tactile feedback mechanism. Output devices 514 can also include ports for one or more peripheral devices, such as headphones, peripheral speakers, and/or a peripheral display.

The input devices 516 can include any sort of input devices known in the art. For example, input devices 516 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 520 can store one or more sets of instructions (e.g., a set of computer-executable instructions), such as software or firmware, that embodies any one or more of the methodologies or functions described herein. The instructions can also reside, completely or at least partially, within the memory 504, processor(s) 508, and/or communication interface(s) 510 during execution thereof by the one or more computing devices 502 of the environment 100. The memory 504 and the processor(s) 508 also can constitute machine readable media 520. The instructions may cause the processor(s) 508 to perform operations described in this document.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method comprising:
    receiving, by a processor and from a first computing device, a first request to retrieve a first data record from a storage framework, the storage framework comprising:
        a first storage cluster, and
        a second storage cluster;
    querying, by the processor and based on the first request, the storage framework to determine:
        a first weight associated with the first storage cluster, and
        a second weight associated with the second storage cluster;
    predicting, by the processor and based on the first weight, a first likelihood of retrieving the first data record from the first storage cluster;
    predicting, by the processor and based on the second weight, a second likelihood of retrieving the first data record from the second storage cluster;
    determining, by the processor and based on the first likelihood, the second likelihood, and a range associated with a probability distribution, a likelihood threshold;
    determining, by the processor, first data representing that a first value sampled from the probability distribution exceeds the likelihood threshold;
    providing, by the processor and based on the first data, the first request to the first storage cluster;
    receiving, by the processor and based on providing the first request to the first storage cluster, the first data record from the first storage cluster; and
    providing, by the processor and to the first computing device, the first data record.

2. The method of claim 1, further comprising:
    determining, by the processor, a retrieval latency associated with routing the first request to the first storage cluster and receiving the first data record from the first storage cluster; and
    updating, by the processor, the first weight based on the retrieval latency.

3. The method of claim 1, further comprising:
    determining, by the processor, a capacity measure associated with the first storage cluster; and
    updating, by the processor, the first weight based on the capacity measure.

4. The method of claim 1, further comprising:
    determining, by the processor, a first retrieval statistic associated with the first data record;
    determining, by the processor, that the first retrieval statistic exceeds a threshold; and
    based on determining that the first retrieval statistic exceeds the threshold, storing, by the processor, the first data record on the storage framework.

5. The method of claim 4, further comprising:
    receiving, by the processor, a notification indicative of an update to the first data record; and
    based on receiving the notification, removing, by the processor, the first data record from the storage framework.

6. The method of claim 5, further comprising:
    determining, by the processor, a second retrieval statistic associated with a second data record;
    determining, by the processor, whether the second retrieval statistic has a value that exceeds the threshold; and
    updating the threshold based on the threshold.

7. The method of claim 6, further comprising:
    determining, by the processor, that the first retrieval statistic fails to exceed the threshold; and
    based on determining that the first retrieval statistic fails to exceed the threshold, removing, by the processor, the first data record from the storage framework.

8. The method of claim 1, further comprising:
    receiving, by the processor, a notification about unavailability of the first storage cluster; and
    based on receiving the notification, updating, by the processor, the first weight.

9. The method of claim 1, further comprising:
    determining, by the processor, a network utilization of the first storage cluster; and updating, by the processor, the first weight based on the network utilization.

10. A computing system, comprising:
a processor; and
memory storing computer-executable instructions that, when executed by the processor, cause the computing system to perform operations comprising:
receiving, from a first computing device, a first request to retrieve a first data record from a storage framework, the storage framework comprising:
a first storage cluster, and
a second storage cluster;
querying, based on the first request, a storage medium to determine:
a first weight associated with the first storage cluster, and
a second weight associated with the second storage cluster;
predicting, based on the first weight, a first likelihood of retrieving the first data record from the first storage cluster;
predicting, based on the second weight, a second likelihood of retrieving the first data record from the second storage cluster;
determining, based on the first likelihood, the second likelihood, and a range associated with a probability distribution, a likelihood threshold;
determining first data representing that a first value sampled from the probability distribution exceeds the likelihood threshold;
providing, based on the first data, the first request to the first storage cluster;
receiving, based on providing the first request to the first storage cluster, the first data record from the first storage cluster; and
providing, to the first computing device, the first data record.

11. The computing system of claim 10, the operations further comprising:
determining a retrieval latency associated with routing the first request to the first storage cluster and receiving the first data record from the first storage cluster; and
updating the first weight based on the retrieval latency.

12. The computing system of claim 10, the operations further comprising:
determining a first retrieval statistic associated with the first data record;
determining that the first retrieval statistic exceeds a threshold; and
based on determining that the first retrieval statistic exceeds the threshold, storing the first data record on the storage medium.

13. The computing system of claim 12, the operations further comprising:
receiving a notification indicative of an update to the first data record; and
based on receiving the notification, removing the first data record from the storage medium.

14. The computing system of claim 10, the operations further comprising:
determining a capacity measure associated with the first storage cluster; and
updating the first weight based on the capacity measure.

15. One or more non-transitory computer-readable media storing computer-executable instructions that, when executed by a processor, cause the processor to perform operations, comprising:
receiving, from a first computing device, a first request to retrieve a first data record from a storage framework, the storage framework comprising:
a first storage cluster, and
a second storage cluster;
querying, based on the first request, a storage medium to determine:
a first weight associated with the first storage cluster, and
a second weight associated with the second storage cluster;
predicting, based on the first weight, a first likelihood of retrieving the first data record from the first storage cluster;
predicting, based on the second weight, a second likelihood of retrieving the first data record from the second storage cluster;
determining, based on the first likelihood, the second likelihood, and a range associated with a probability distribution, a likelihood threshold;
determining first data representing that a first value sampled from the probability distribution exceeds the likelihood threshold;
providing, based on the first data, the first request to the first storage cluster;
receiving, based on providing the first request to the first storage cluster, the first data record from the first storage cluster; and
providing, to the first computing device, the first data record.

16. The one or more non-transitory computer-readable media of claim 15, the operations further comprising:
determining a retrieval latency associated with routing the first request to the first storage cluster and receiving the first data record from the first storage cluster; and
updating the first weight based on the retrieval latency.

17. The one or more non-transitory computer-readable media of claim 15, the operations further comprising:
determining a first retrieval statistic associated with the first data record;
determining that the first retrieval statistic exceeds a threshold; and
based on determining that the first retrieval statistic exceeds the threshold, storing the first data record on the storage medium.

18. The one or more non-transitory computer-readable media of claim 17, the operations further comprising:
receiving a notification indicative of an update to the first data record; and
based on receiving the notification, removing the first data record from the storage medium.

19. The one or more non-transitory computer-readable media of claim 15, the operations further comprising:
determining a capacity measure associated with the first storage cluster, and
updating the first weight based on the capacity measure.

* * * * *